US012758026B2

(12) United States Patent
Nesmeev

(10) Patent No.: US 12,758,026 B2
(45) Date of Patent: Oct. 13, 2026

(54) SEGMENTED MATTRESS

(71) Applicant: Evgeny A. Nesmeev, Ulan-Ude (RU)

(72) Inventor: Evgeny A. Nesmeev, Ulan-Ude (RU)

(*) Notice: Subject to any disclaimer, the term of this patent is extended or adjusted under 35 U.S.C. 154(b) by 212 days.

(21) Appl. No.: 18/836,606

(22) PCT Filed: Jan. 20, 2023

(86) PCT No.: PCT/RU2023/000013
§ 371 (c)(1),
(2) Date: Feb. 27, 2025

(87) PCT Pub. No.: WO2023/153956
PCT Pub. Date: Aug. 17, 2023

(65) Prior Publication Data
US 2025/0194812 A1 Jun. 19, 2025

(30) Foreign Application Priority Data
Feb. 8, 2022 (RU) ................................ 2022103122

(51) Int. Cl.

| | |
|---|---|
| ***A61H 23/02*** | (2006.01) |
| ***A47C 27/00*** | (2006.01) |
| ***A47C 27/06*** | (2006.01) |
| ***A47C 31/00*** | (2006.01) |
| ***A61H 1/00*** | (2006.01) |

(52) U.S. Cl.
CPC ............ *A47C 27/001* (2013.01); *A47C 27/06* (2013.01); *A47C 31/003* (2013.01); *A61H 1/001* (2013.01); *A61H 23/0218* (2013.01); *A61H 2201/0146* (2013.01); *A61H 2201/1207* (2013.01); *A61H 2201/1654* (2013.01); *A61H 2201/5007* (2013.01); *A61H 2203/0443* (2013.01)

(58) Field of Classification Search
CPC ..... A47C 27/001; A47C 27/06; A47C 31/003; A47C 27/15; A47C 27/04; A47C 27/14; A61H 1/001; A61H 23/0218; A61H 2201/0146; A61H 2201/1207; A61H 2201/1654; A61H 2201/5007; A61H 2203/0443
See application file for complete search history.

(56) References Cited

U.S. PATENT DOCUMENTS

2007/0094808 A1* 5/2007 Jansen ................ A47C 27/001
5/738

* cited by examiner

*Primary Examiner* — Aaron R Eastman
(74) *Attorney, Agent, or Firm* — Lawrence G. Fridman, ESQ; FEIGIN & FRIDMAN, LLC

(57) ABSTRACT

The segmented mattress consists of a cover with upper and lower parts connected by a zipper and contains foam sheets and a spring part. The foam sheets are divided into parts, which are placed in mattress elements made in the form of boxes mounted side by side on a fabric base by Velcro fasteners. The fabric base is fastened to the bottom of the mattress inside the mattress by a zipper sewn along its perimeter. The boxes additionally contain massaging electromagnetic devices operating from a programmable control unit. The massaging devices contain a massaging device body, an electromagnet and a guide core with a permanent magnet.

8 Claims, 24 Drawing Sheets

A

B

A

B

C

D

SEGMENTED MATTRESS

FIELD AND BACKGROUND OF THE INVENTION

Segmented mattress (hereinafter: mattress) relates to the field of bedding. The mattress is intended for use with sofas, as well as together with other mattresses of any type. Various designs of the mattresses known to the inventor from the prior art are disclosed by the following documents: RU2016142703A, U.S. Pat. Nos. 3,846,857A, 5,107,558A, 6,256,821B1 and 7,059,001B2.

The main disadvantage of any mattress is wear and tear in the form of pockets developed during the use. This mainly refers to the degradation of the various foam materials used in the manufacture of various types of mattresses. The degradation of the mattress comfort layer is inevitable and has to be tolerated by a user.

The owner of the mattress lies down on it every evening, at the same place as the day before. Thus, the mattress is subjected to local loads for 7-10 hours every day.

In order for the mattress to last long enough, manufacturers recommend buying mattresses with increased hardness. However, such mattresses are not comfortable enough, because they do not provide uniform support over the entire area of the user's body.

In addition, for foam materials a time factor should be considered. This is because the materials that create the comfort layer of any mattress deteriorate over time and lose elasticity even without load. Almost always, when the mattress ceases to be comfortable, its spring part consisting of a steel wire and steel springs, continues to be fully functional.

Clarification, in the application any material intended for use in mattresses as a comfort layer will be referred to in this description as: foam.

In addition, there are currently available on the market so-called toppers (thin sofa mattresses), which are designed for laying on top of sofas or on top of any other mattresses.

Their main problem is the same as that of any other mattresses, because their comfort layer consists of a continuous (over the entire area of the mattress) foam rubber sheet, which, with sufficiently long use, wears out with the formation of depressions and waviness at the edges.

Further, mattresses become unusable and lose their performance properties due to contamination and damage to the outer fabric layer (cover). The problem of degradation of foam rubber or any other foam material that makes up the comfortable layer of a mattress is a big problem for all consumers. For this and other reasons described above, in the USA alone, over 18 million mattresses are thrown into landfills every year. The main problem is the same as with any other mattresses, because their comfortable layer consists of a solid (over the entire area of the mattress) foam rubber a sheet that, with sufficiently long use, wears out with the formation of depressions and waviness along the edges.

BRIEF DESCRIPTION OF THE DRAWINGS

The subject matter regarded as the invention is particularly pointed out and distinctly claimed in the concluding portion of the specification. The invention, however, the apparatus of the invention, together with objects, features, and advantages thereof, may best be understood by reference to the following detailed description when read with the accompanying drawings, wherein the design of the mattress is shown in the following figures:

FIG. 1B shows a section of the box, where 8 is a foam rubber (hereinafter foam rubber of any shape and size is denoted by the number 8), 4 is the box, 5 is synthetic felt or coconut coir.

Synthetic felt is a dense and resilient non-woven material made from synthetic fibers. Unlike natural wool felt, it does not rot, is not affected by mold, dries quickly, and is tear resistant. Coconut coir (coir) is a layer consisting of fibers covering the fruit of the coconut palm.

A zipper is a type of fastener designed to quickly connect parts of clothing. It is also used in bags, sporting goods, camping equipment and other items.

Textile fastener (Velcro, Velcro tape, contact tape, burdock) is a fastener used in the industry.

In addition to coconut coir or synthetic felt, other material with suitable properties can be used.

Figure 2:
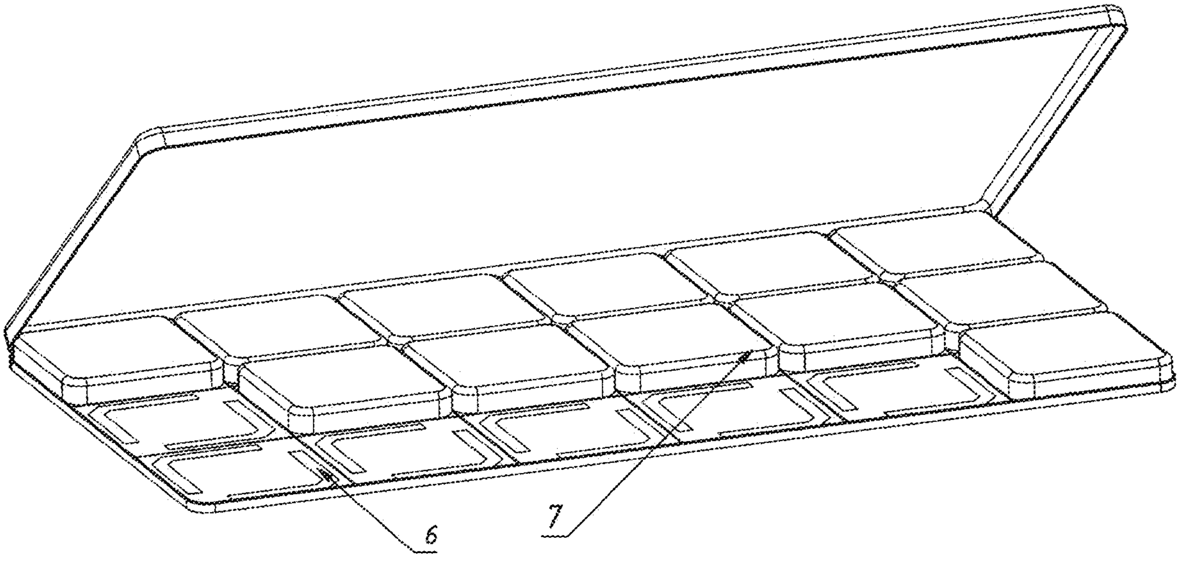

Referring now to FIG. 2, wherein, 6 is a Velcro fastener (hereinafter: Velcro, no distinction will be made in the text between Velcro parts as it consists of two parts). It is understood that all Velcro is always on the correct side. Also, no distinction will be made between the shapes and sizes of Velcro, nor between the places where it is installed. Velcro installed in any place and of any size and configuration will be designated by the number 6, markings for the installation of boxes—7 (hereinafter: markings).

Figure 3A:
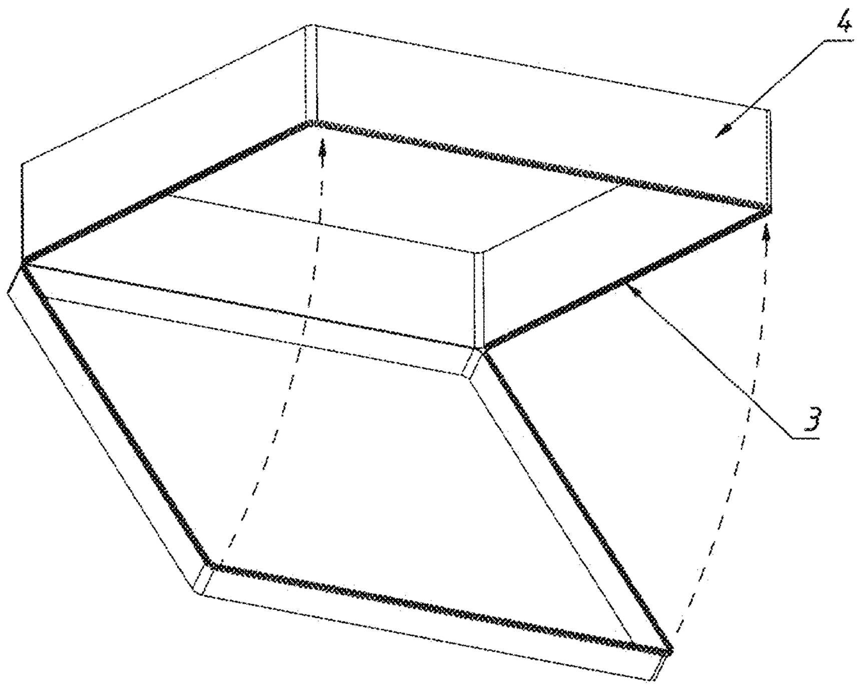
Figure 3B:
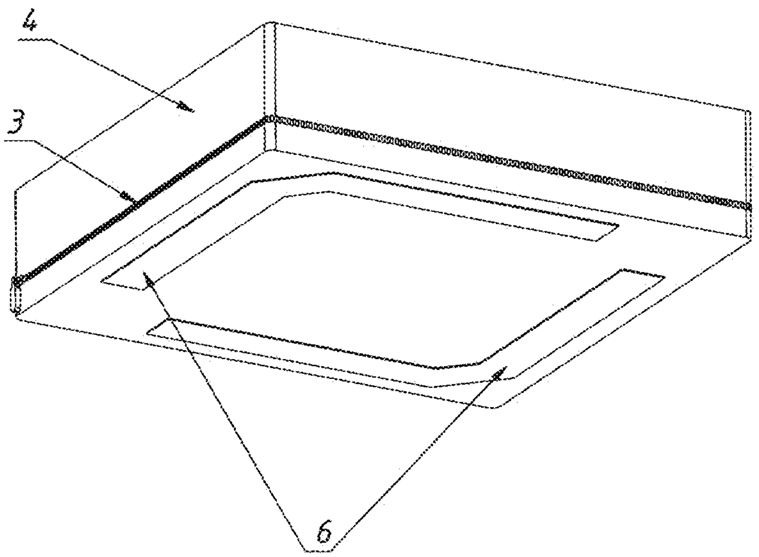

Referring now to FIGS. 3A and 3B, wherein, the construction of a zipper box (bottom view) is shown, and 3 is a zipper, 4 is a box, and 6 is Velcro.

Figure 4A:
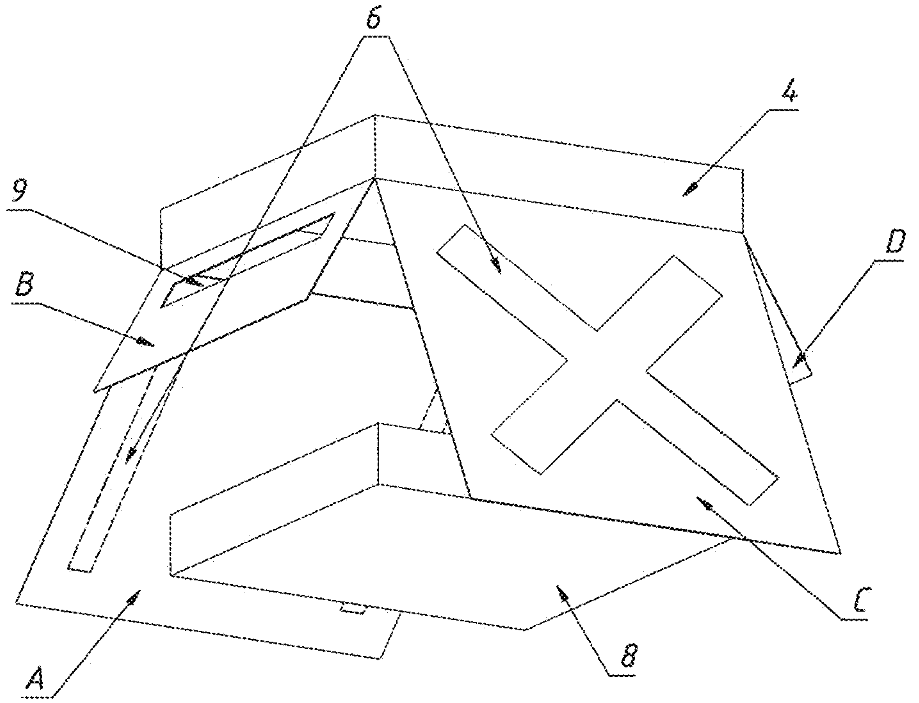
Figure 4B:
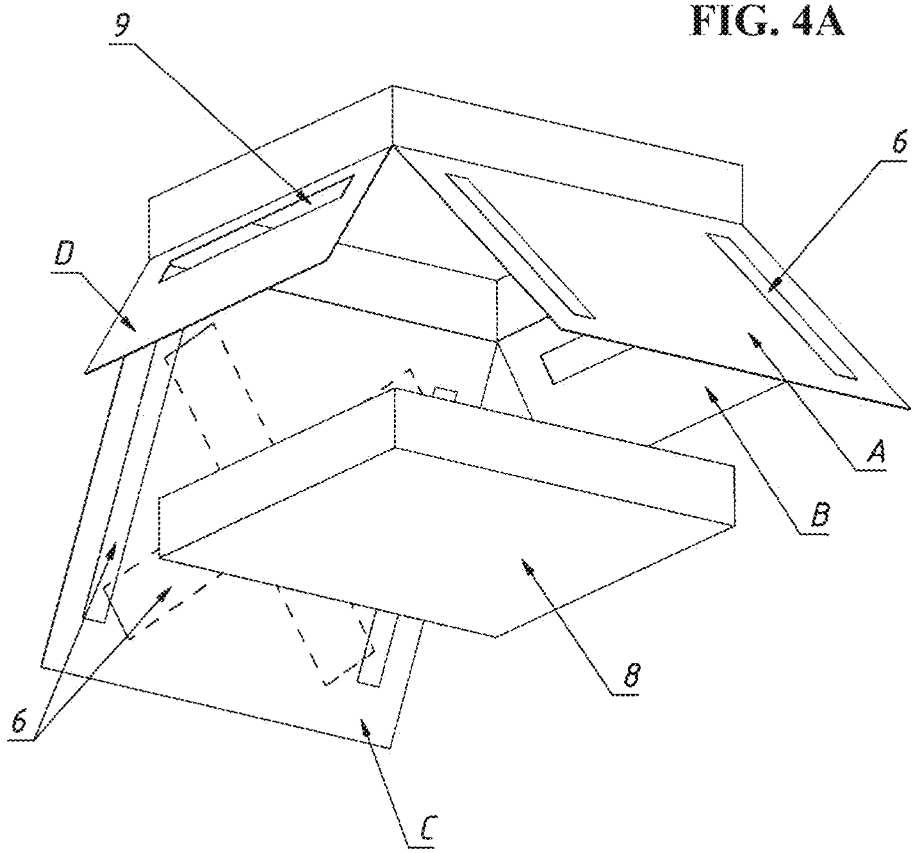

Referring now to FIGS. 4A and 4B (bottom views), wherein the construction of the box is similar to that of a cardboard box, and wherein, 4 is a box, 6 is Velcro, 8 is foam, 9 is a window for the Velcro (hereinafter: window), the flaps are A, B, C, D.

Figure 5A:
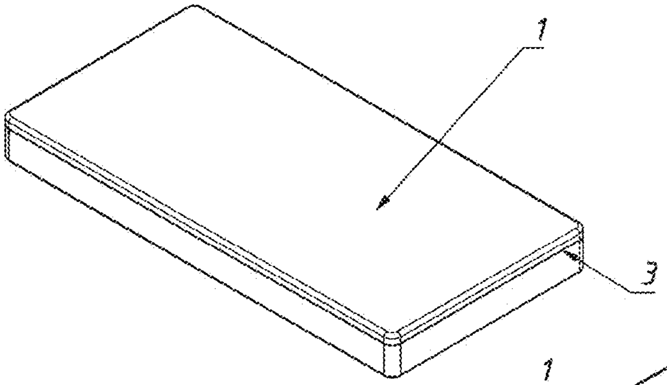
Figure 5B:
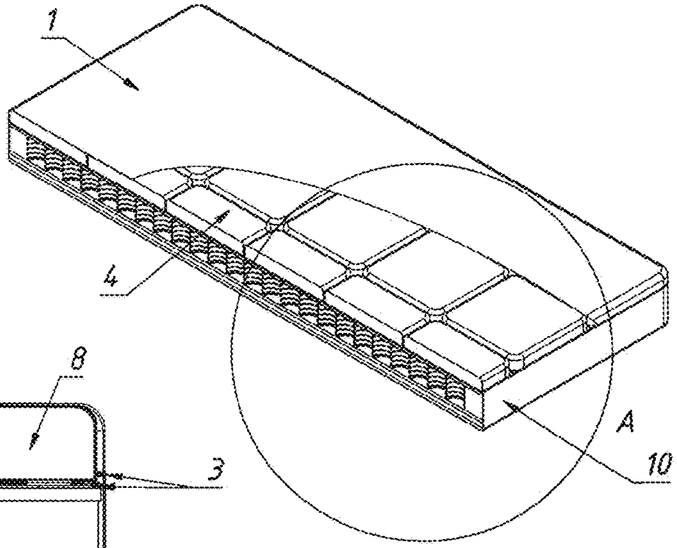
Figure 5C:
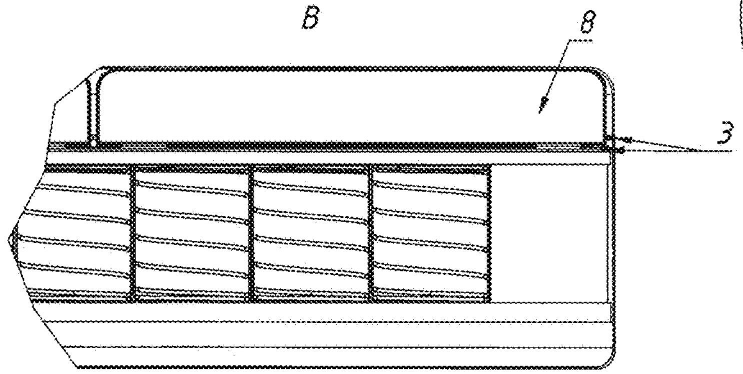
Figure 5D:
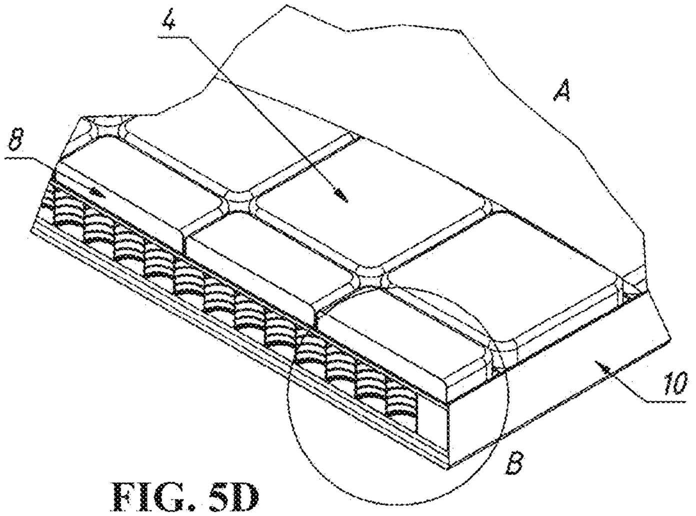

Referring now to FIGS. 5A, 5B, 5C and 5D, which show a multilayer mattress, the upper part of which is a segmented mattress attached to it with a zipper, where 1 is the upper part of the cover, 3 is a zipper, 4 is a box, 8 is foam rubber, 10 is a multilayer mattress. FIG. 5C illustrates 3 zipper, and 8 foam rubber.

Figure 6:
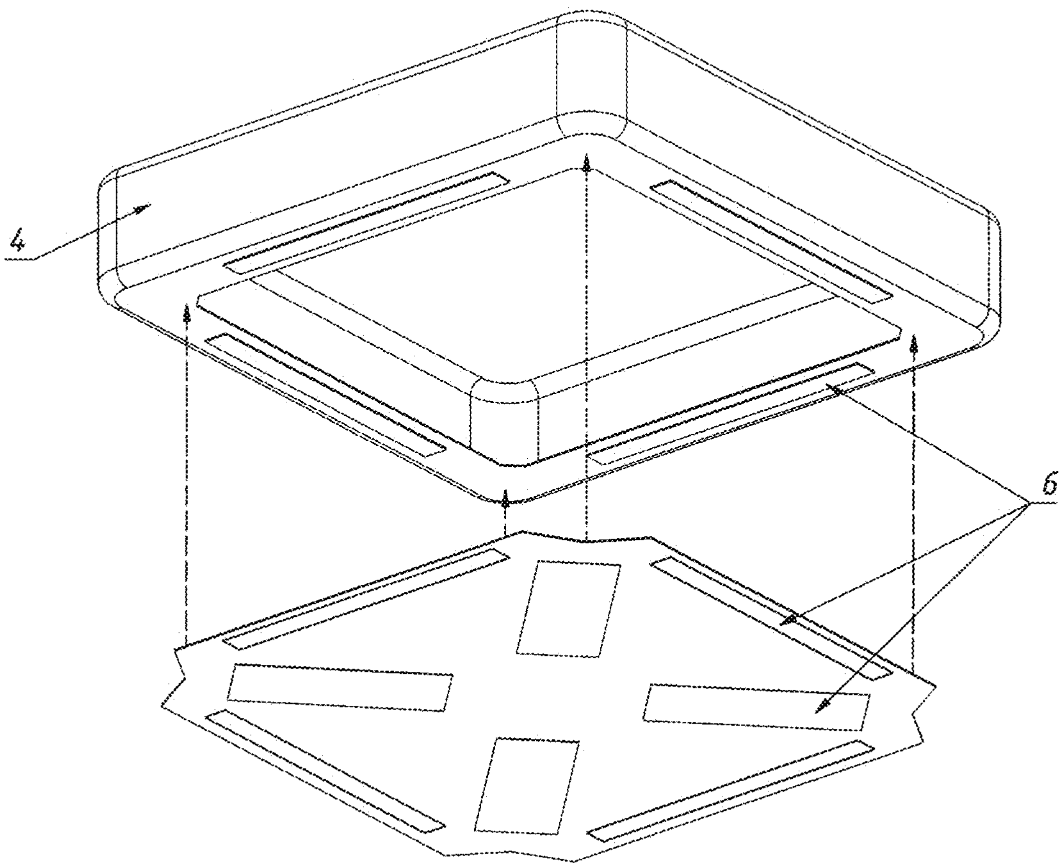

FIG. 6 shows an embodiment of a box with a lid (bottom view), where 4 is a box, 6 is Velcro.

Figure 7:
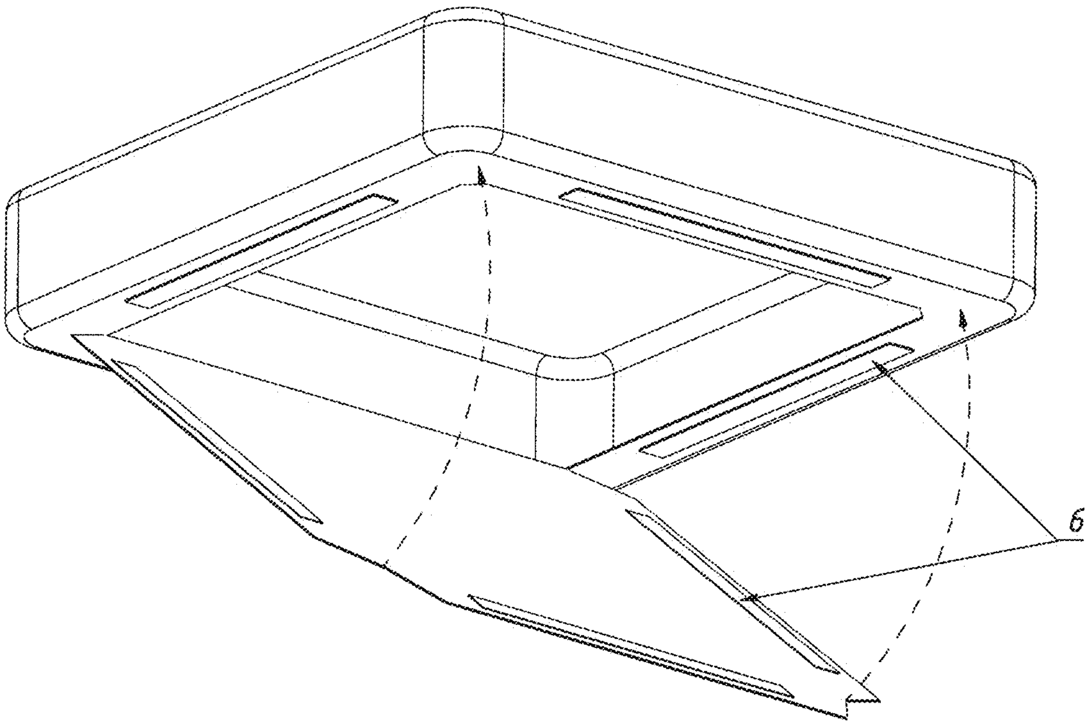

FIG. 7 shows an embodiment of a box with a lid (bottom view), one side of which is sewn to the bottom side of the box, where 6 are Velcro.

Figure 8A:
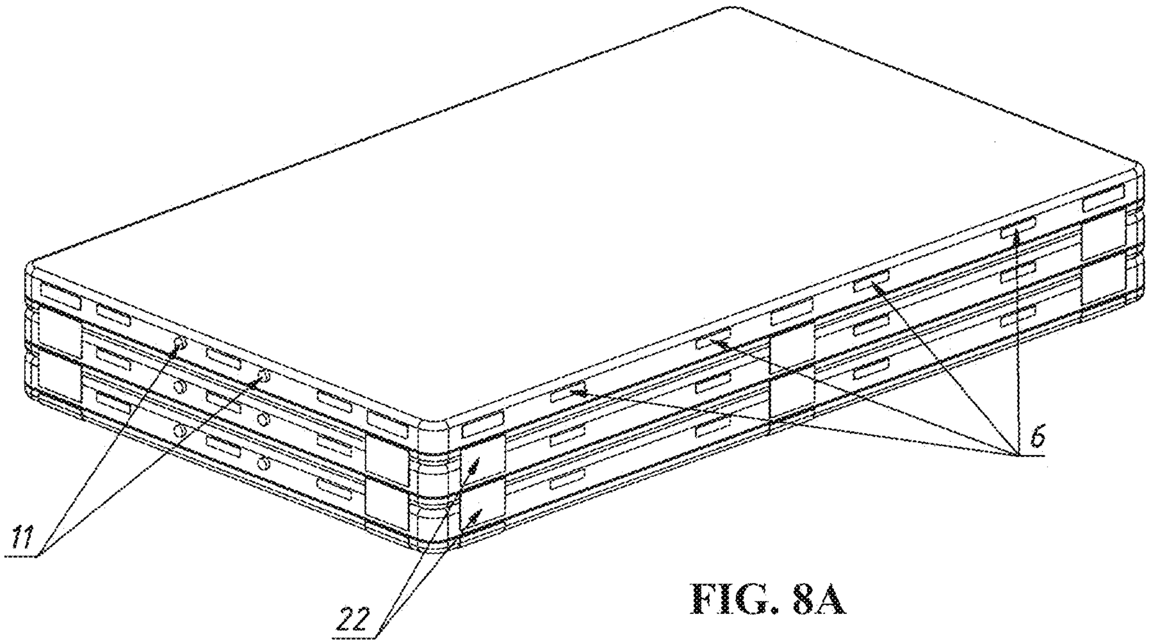
Figure 8B:
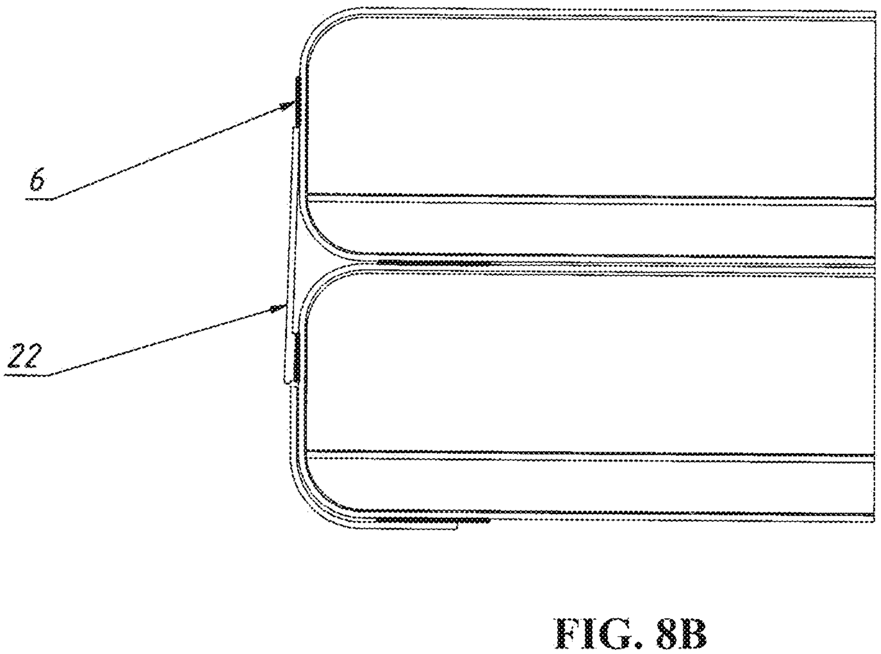

Referring now to FIGS. 8A and 8B, which show an example of the assembly of multi-segmented mattresses laid one on top of the other, where 22 are linings with Velcro, 11 are buttons or snaps for attaching a sheet, 6 are Velcro. FIG. 8B shows the following elements: 22—pad, 6—Velcro (side view).

Figure 9:
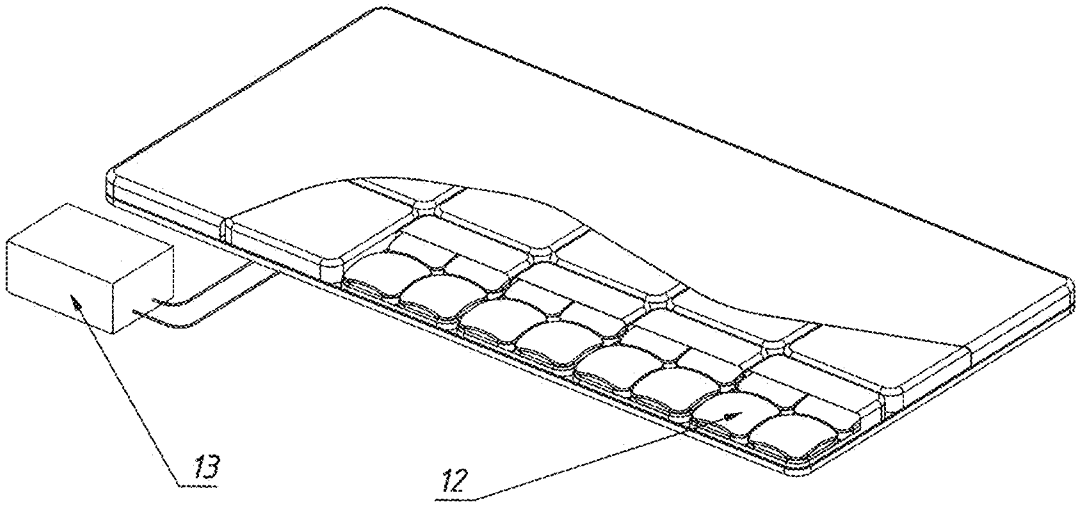

FIG. 9 shows a mattress provided with massaging elements, where 12 is a massaging element, and 13 is a programmable control unit.

Figure 10A:
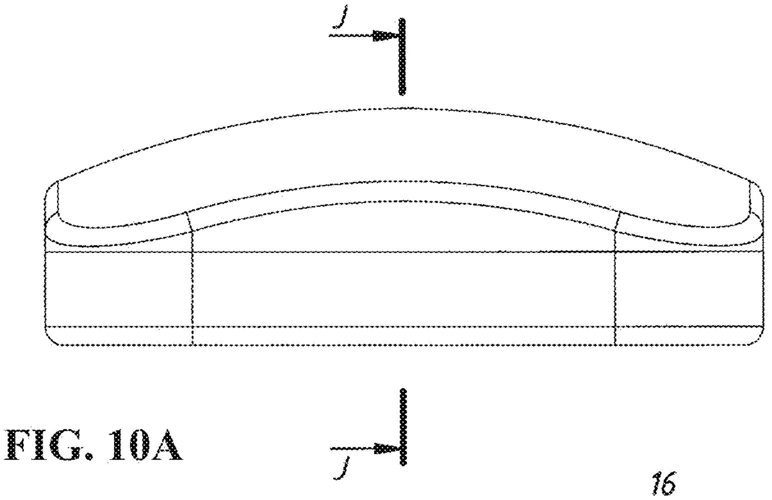
Figure 10B:
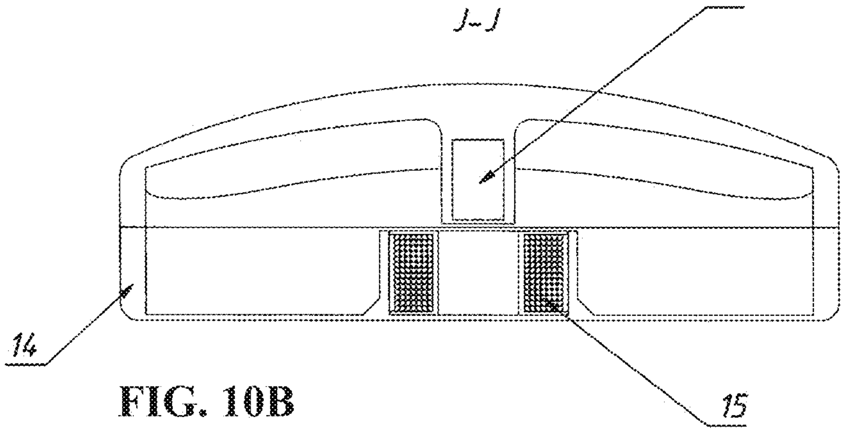
Figure 10C:
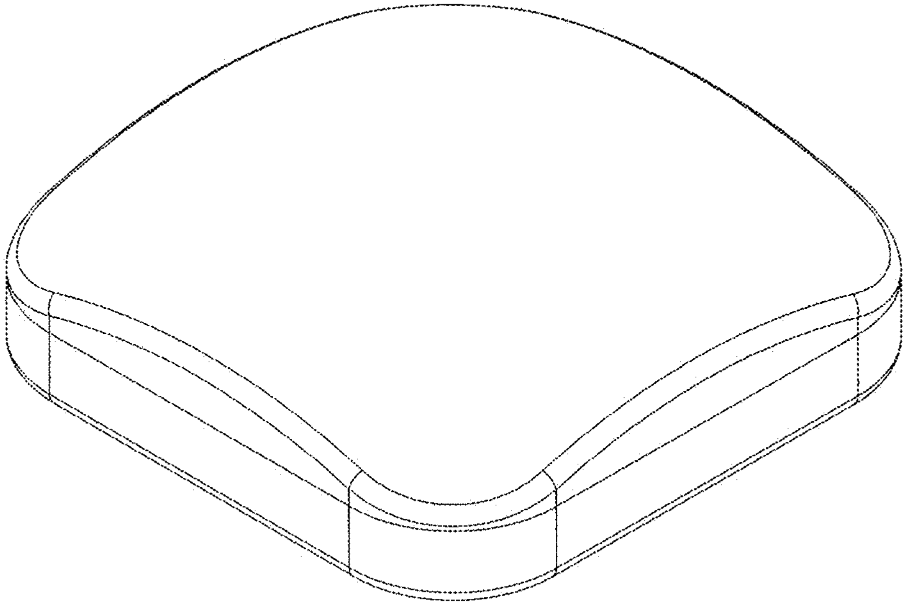

FIGS. 10A, 10B and 10C show a section of the massaging element, where 14 is the body of the massaging element, 15 is an electromagnet (hereinafter any electromagnet mentioned in the text: electromagnet 15), 16 is a guide core with a permanent magnet.

Figure 11A:
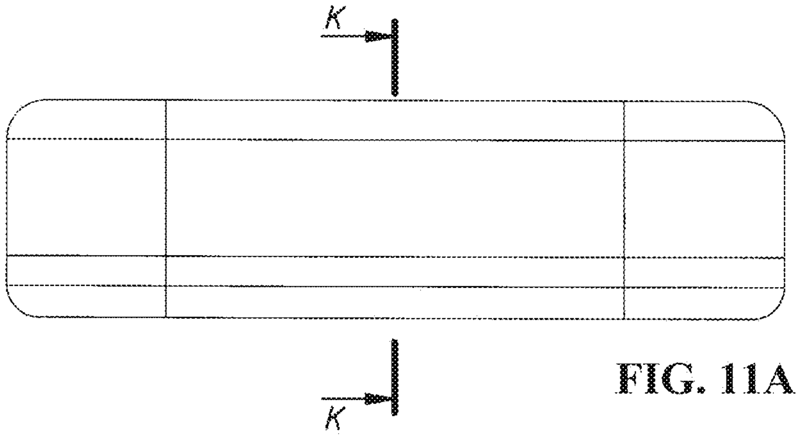
Figure 11B:
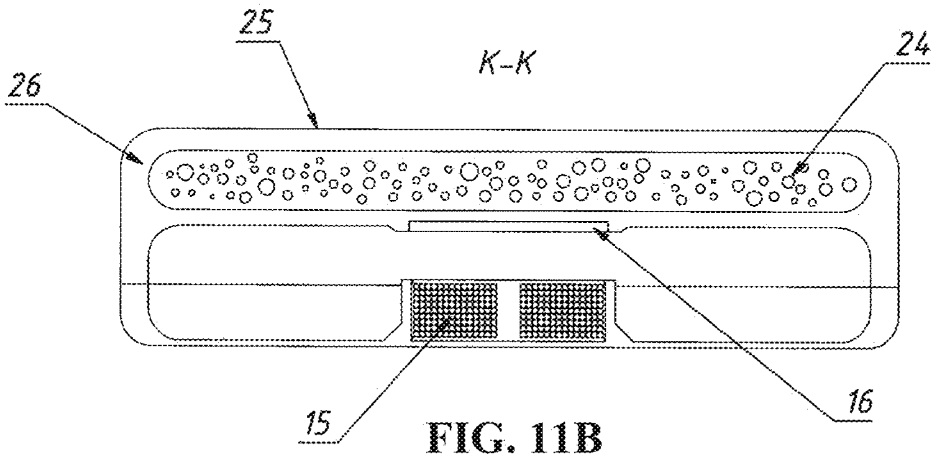
Figure 11C:
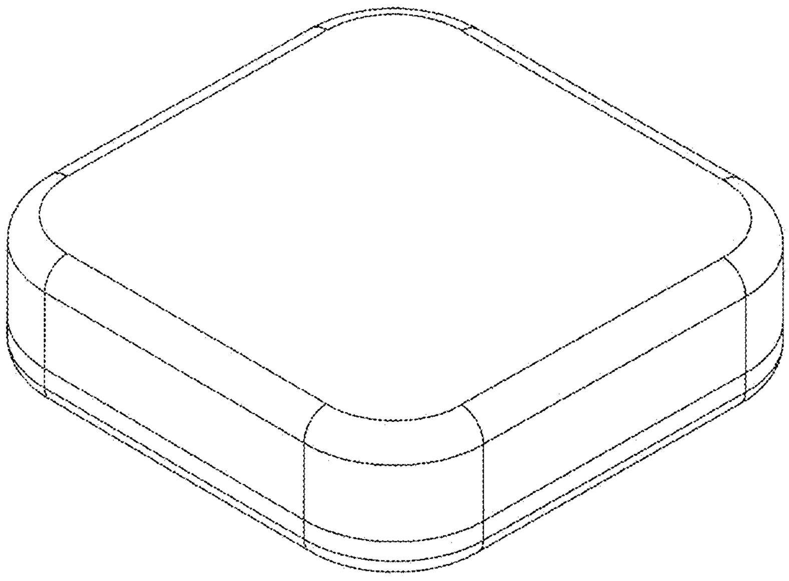

FIGS. 11A, 11B and 11C show another version of the masking element, where 15 is an electromagnet, 16 is a permanent magnet, 24 is liquid, 25 is the top of the massaging element, 26 is a shell.

Figure 12A:
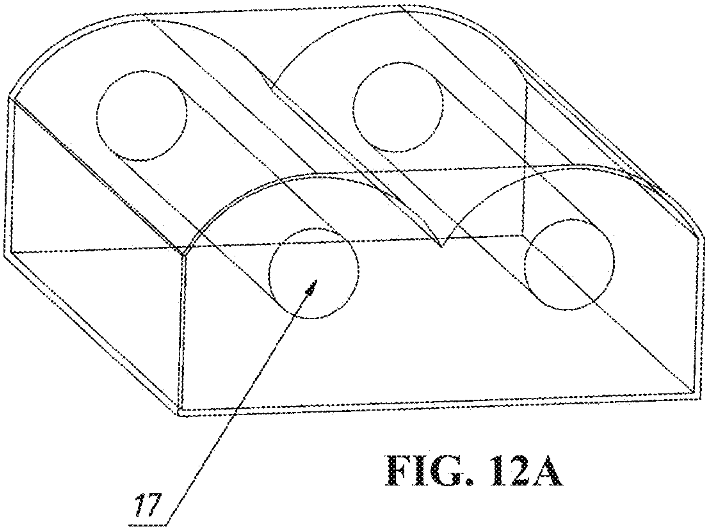
Figure 12C:
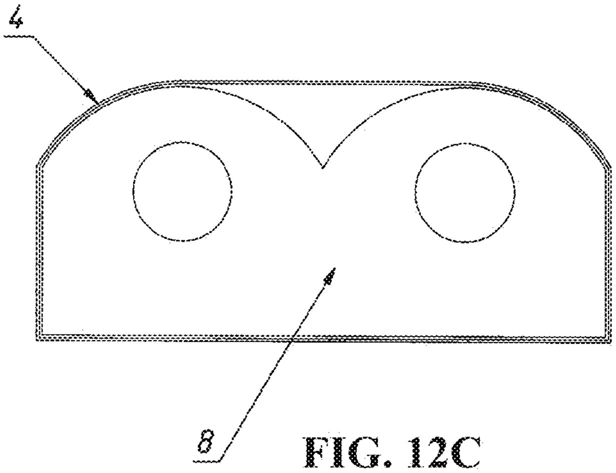
Figure 12B:
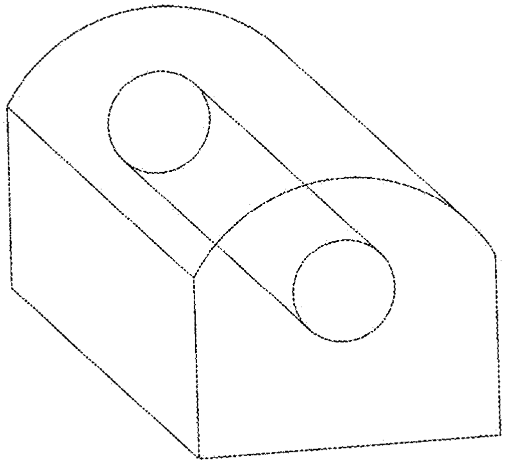

Referring now to FIGS. 12A, 12B and 12C which illustrate examples of foam rubber with a vaulted top. FIG. 12A illustrates a box with a double arch and horizontal perforation of foam rubber. FIG. 12B illustrates an embodiment of a box with a single arch and horizontal perforation of foam rubber, where there is a 17 hole. FIG. 12C is a section of a box with foam rubber with a two-vaulted top, where 4 is a box, 8 is foam rubber.

Figure 13:
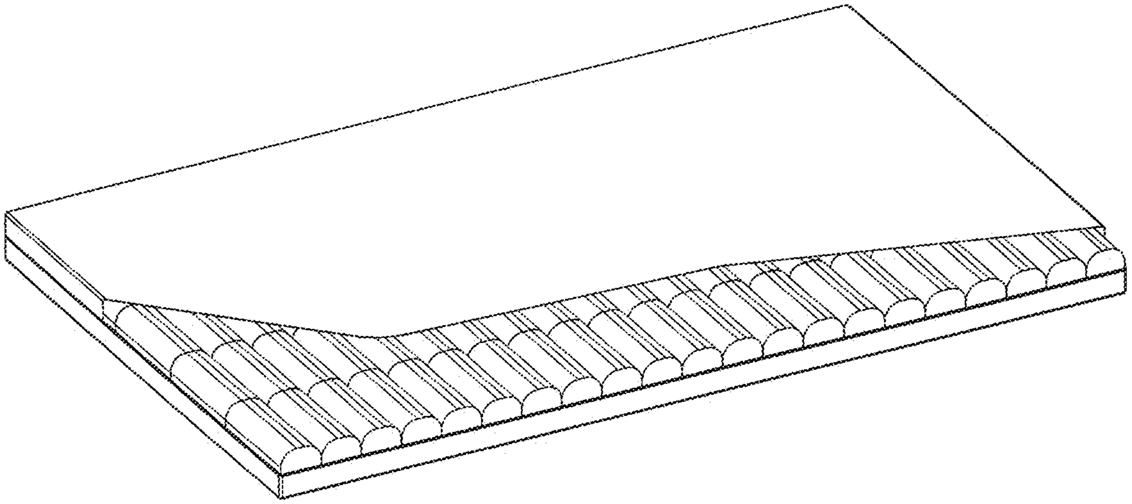

FIG. 13 shows a segmented mattress consisting of boxes with a vaulted top.

Figure 14A:
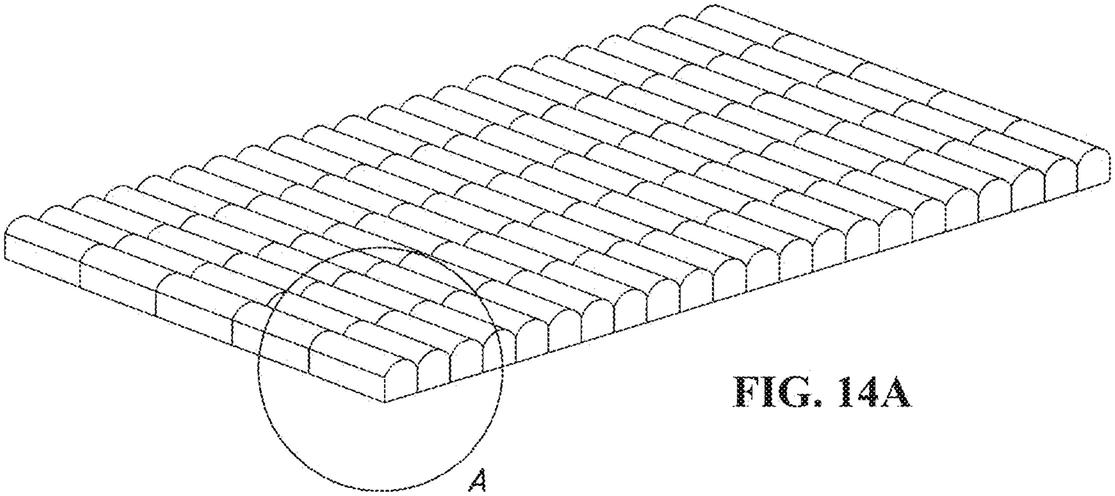
Figure 14B:
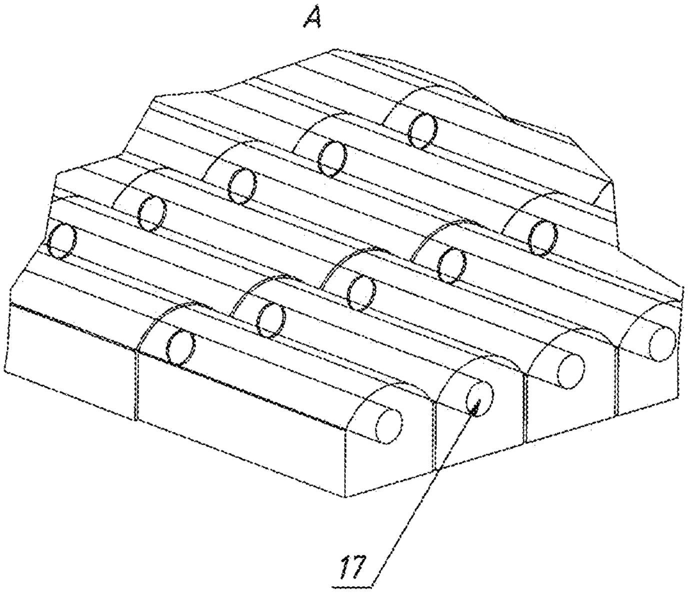

Referring now to FIG. 14A which shows a view of a layer of a mattress consisting of boxes with a vaulted top. FIG. 14B illustrates 17 holes in the foam rubber, the holes are shown with a dotted line, because they are shown with boxes put on them.

Figure 15C:
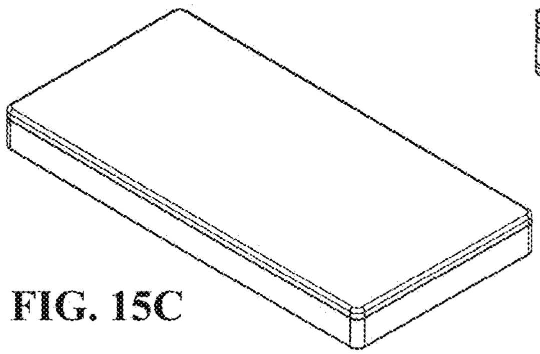
Figure 15A:
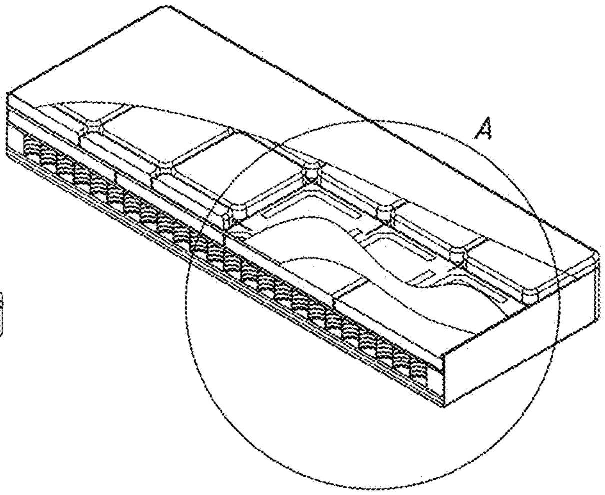
Figure 15D:
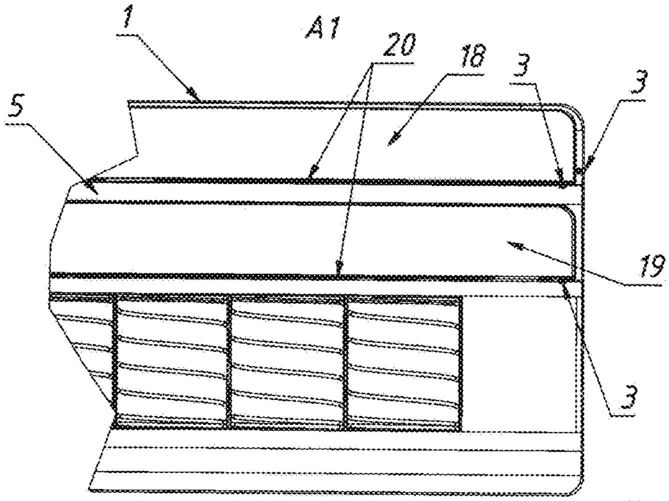
Figure 15B:
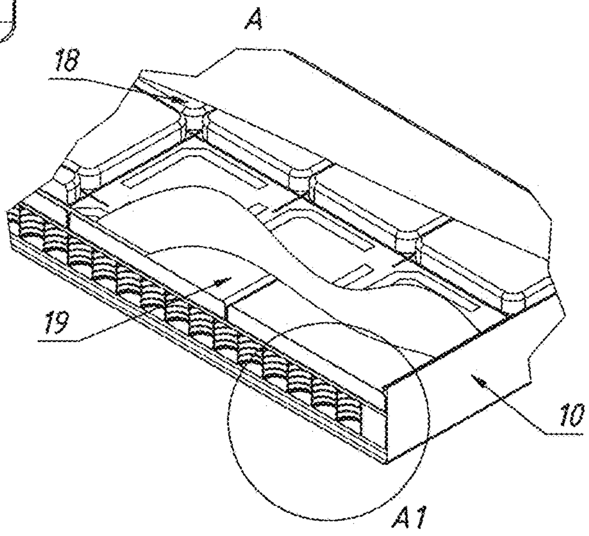

Referring now to FIGS. 15A, 15B, 15C and 15D, which shows a mattress with two layers of boxes fastened with a zipper (not shown) to a spring mattress or without a spring mattress, where 10 is a multi-layer mattress, 18 is the top layer of boxes, 19 is the bottom layer of boxes. FIG. 15D shows the following elements: 1—upper part of the cover, 3—zipper, 5—synthetic felt or coconut coir, 18—top layer of boxes, 19—bottom layer of boxes, 20—fabric base for installing boxes (hereinafter referred to as the base).

Figure 16:
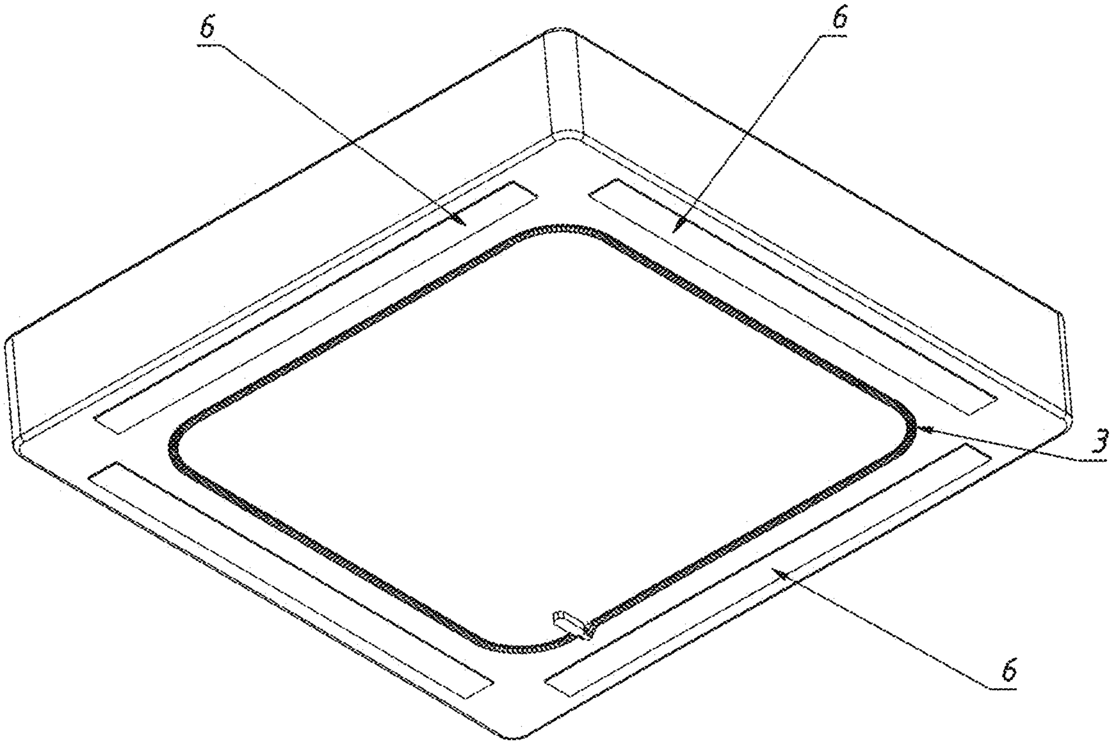

FIG. 16 shows a fastener embodiment for boxes (bottom view), where 3 is a zipper, 6 is Velcro.

Figure 17:
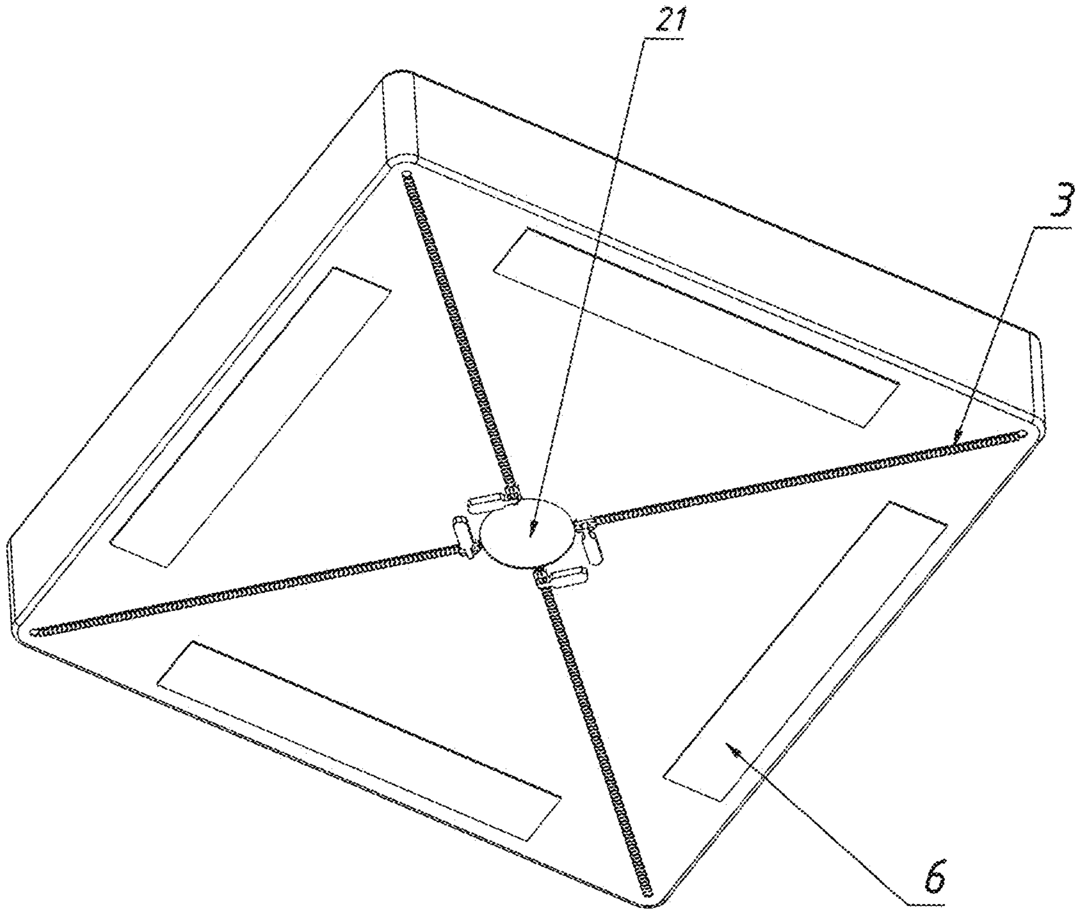

FIG. 17 shows a diagonal version of the box fastener (bottom view), where 3 is a zipper, 6 is Velcro and 21 is a hole.

Figure 18A:
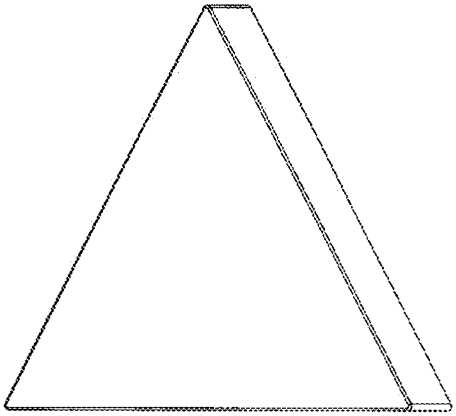
Figure 18B:
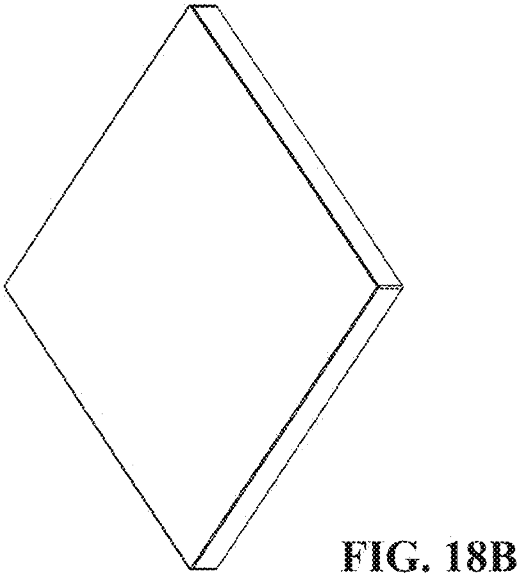
Figure 18C:
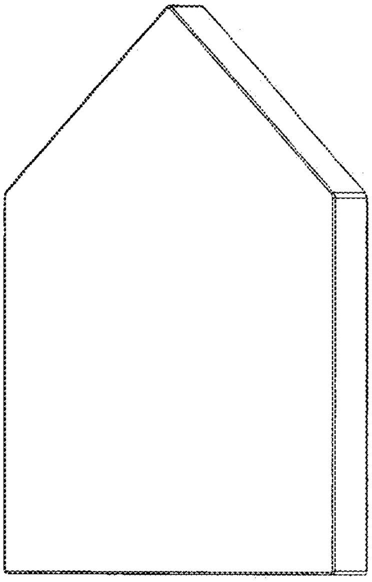
Figure 18D:
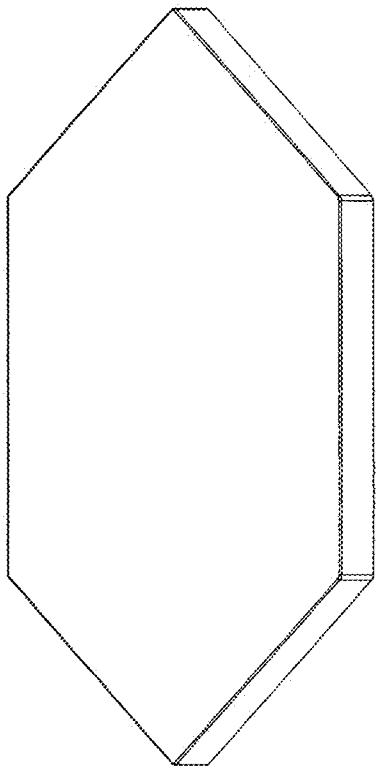

FIG. 18A shows a triangular shaped box; FIG. 18B shows a rhombic box; FIG. 18C shows a pentagonal box; and FIG. 18D shows a hexagonal box.

Figure 19:
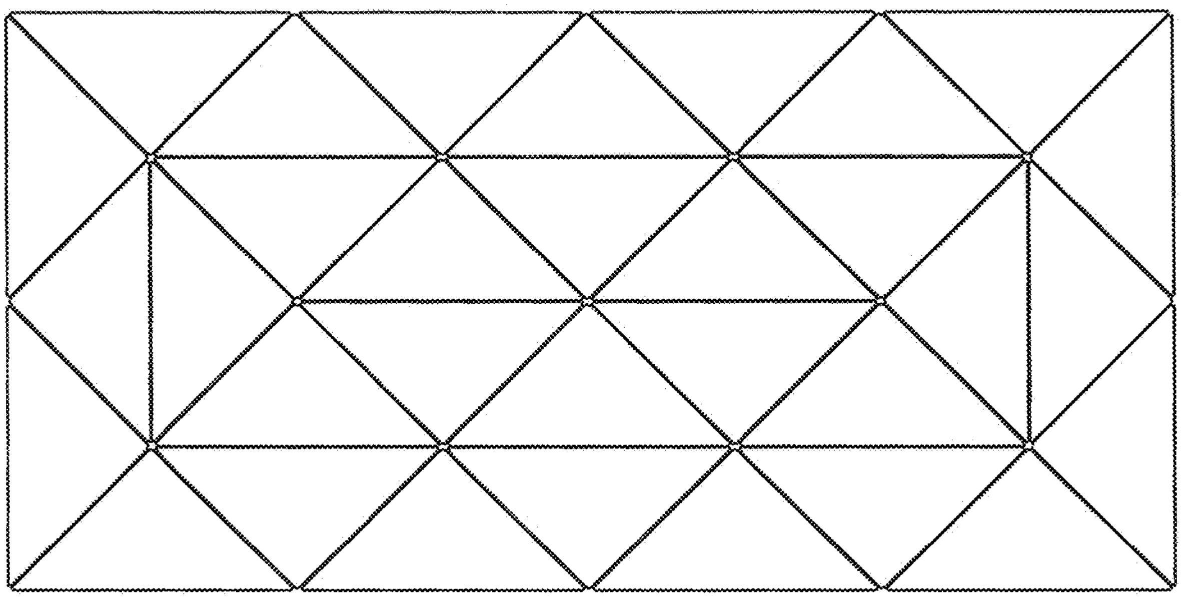

FIG. 19 shows an example of a mattress made up of multiple triangular shaped boxes.

Figure 20:
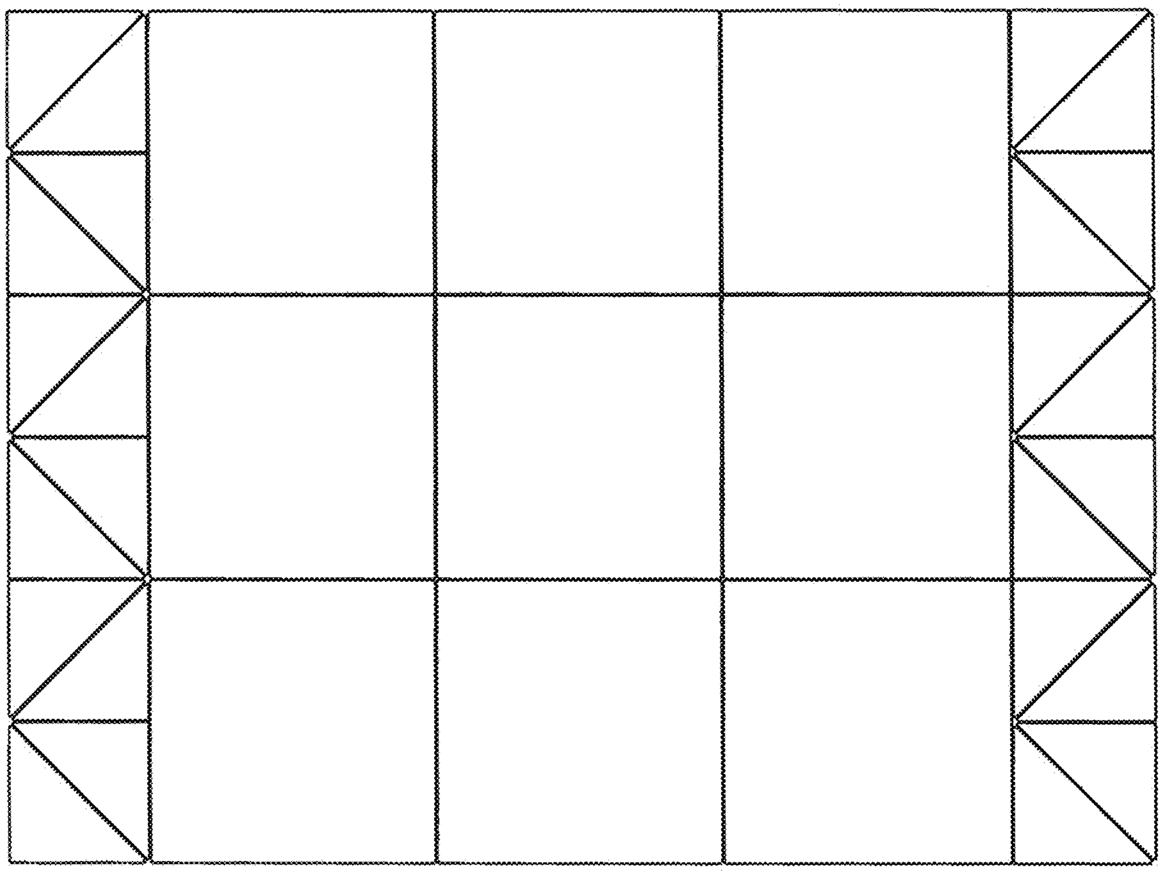

Referring now to FIG. 20, which illustrates an example of a mattress, where rectangular boxes are laid with a wide strip crossing the mattress through the middle from one edge of the mattress to the other edge, and triangular boxes are installed on the right and left sides of the rectangular boxes.

Figure 21:
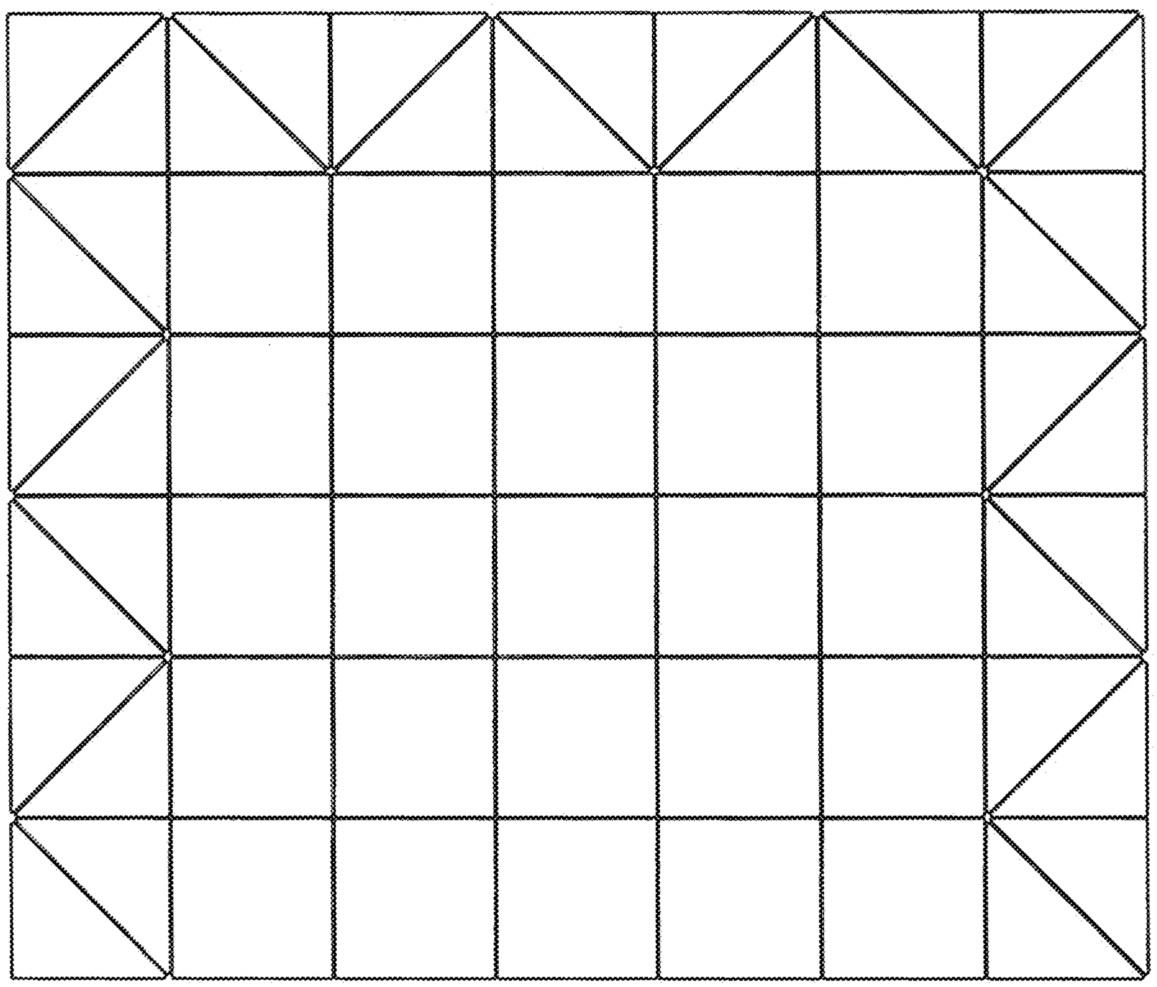

FIG. 21 illustrates an example of a mattress where the rectangular boxes are installed in such a way that they do not completely intersect the mattress, and the triangular boxes frame the rectangular boxes on three sides.

Figure 22:
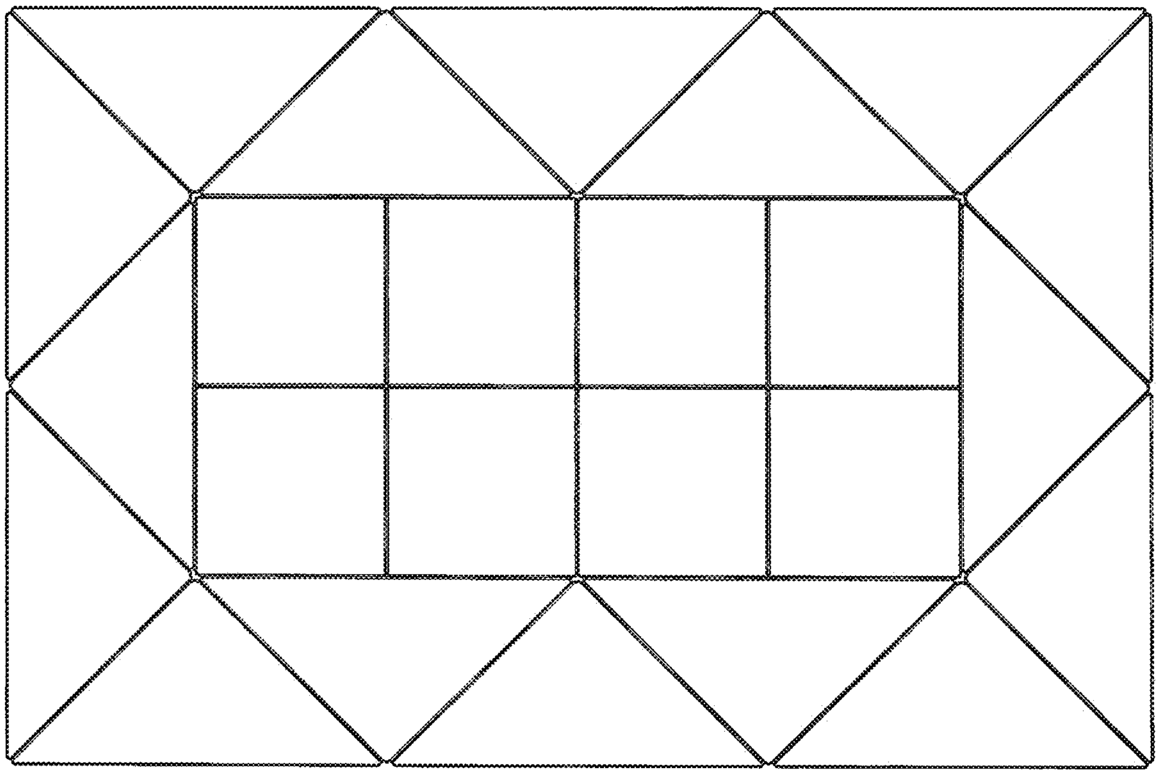

FIG. 22 illustrates an example of a mattress made of rectangular and triangular boxes, where: rectangular boxes are located in the middle of the mattress, and triangular boxes are located on four sides along the periphery.

Figure 23:
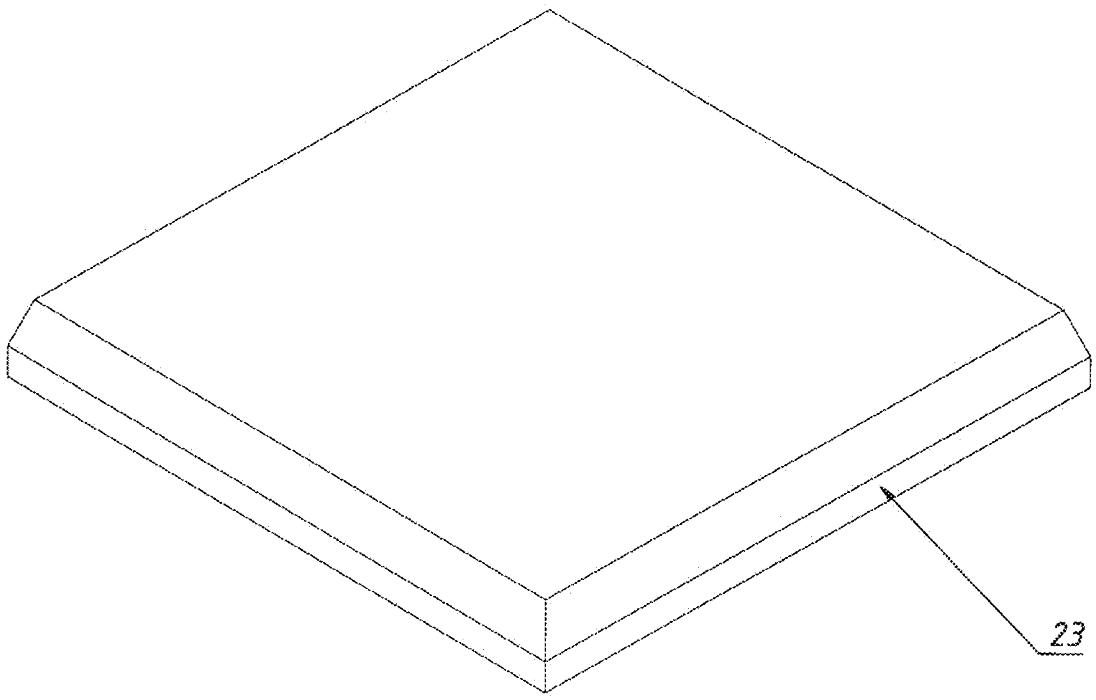

FIG. 23 shows a trapezoidal box with a thickened base 23.

Figure 24:
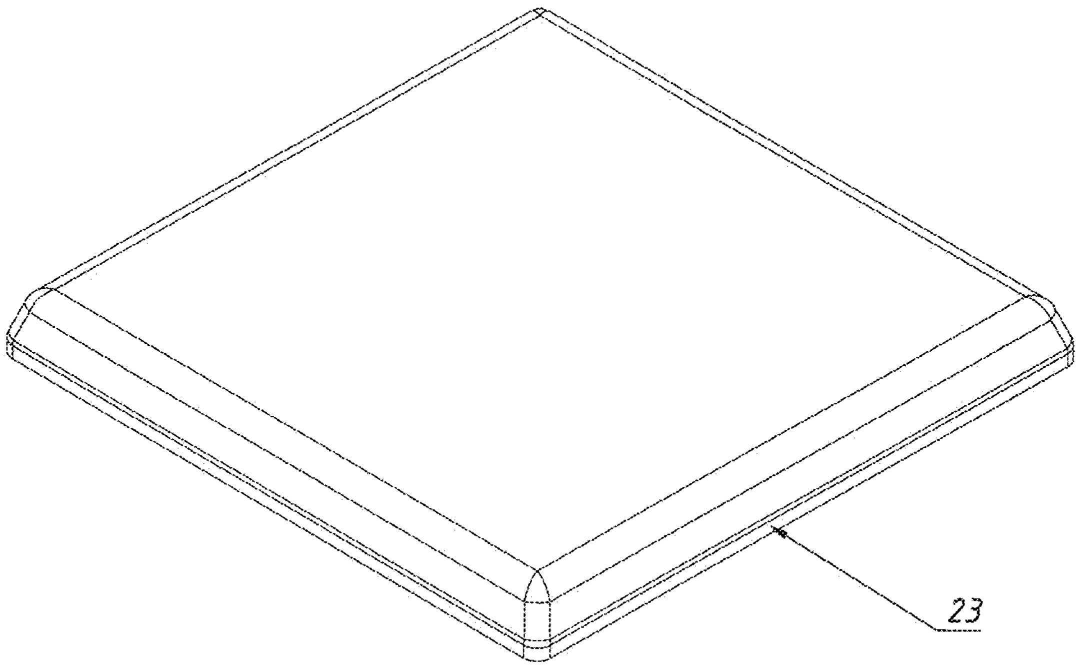

FIG. 24 illustrates a box that is curved upward from base 23.

DESCRIPTION OF THE EMBODIMENTS OF THE INVENTION

Figure 1A:
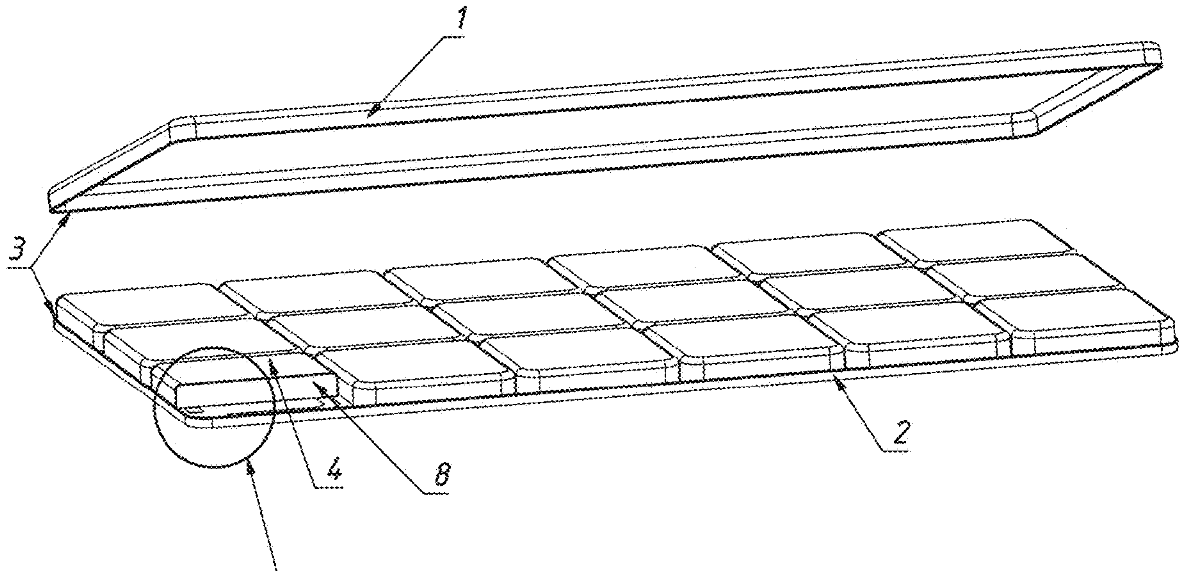
Referring now to FIGS. 1A and 1B, where 1 is the upper part of the cover, 2 is the lower part of the cover, 3 is a zipper lock (hereinafter the zipper, as well as all shown zippers, will be indicated by the number 3, regardless of their size and installation location), 4 is the box (further on, boxes of any design and shape will be indicated by the number 4), 5 is the synthetic felt or coconut coir.
Figure 1B:
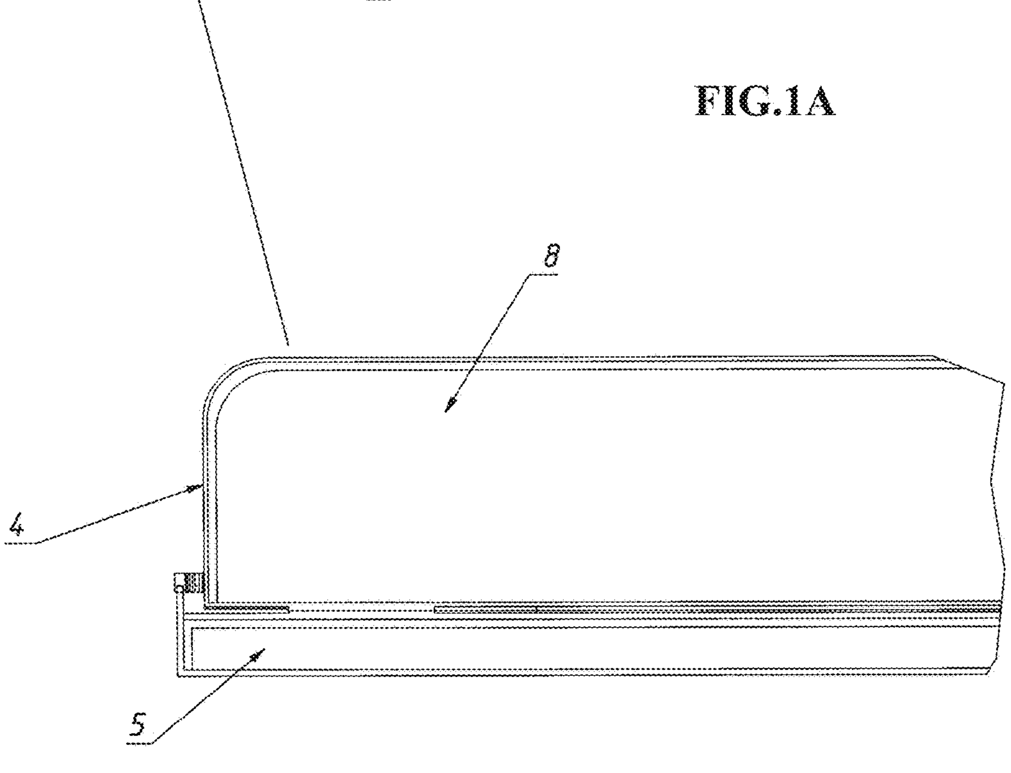

A segmented mattress (see FIG. 1) consists of a fabric cover consisting of the upper part of the cover 1 and the lower part of the cover 2. Moreover, the lower part of cover 2 can include several layers of fabric and a denser material laid between them, which can be, for example: synthetic felt 5 or coconut coir 5.

The upper part of cover 1 and the lower part of cover 2 are fastened together with a zipper 3, which can connect them along the entire perimeter of the mattress with the possibility of completely or partially separating these parts. The upper part of cover 1 also consists of a top layer of fabric and a fabric backing (not shown), as well as a layer including a quilted fabric with a non-woven material, for example: padding polyester (not shown).

On the inner surface of the lower part of the cover there are boxes 4 (see FIGS. 1A, 1B and 2) made of a fabric based on natural, synthetic or artificial fibers, intended for placing inside them pieces of foam rubber 8 (see FIGS. 1A, 1B, 4A, 4B, 5C and 12C) in the form of rectangular parallelepipeds or square parallelepipeds, as well as other shapes corresponding to the shapes of the boxes.

In addition, boxes can be made from non-woven materials based on natural, synthetic or artificial fibers, as well as from natural, synthetic or artificial leather. The corners of the boxes can be straight (substantially equal to 90 degrees), rounded (FIG. 7) or beveled (not shown in the figures). To provide the desired shape, the component parts of the boxes can be fastened by stitching with threads, glued together with glue, or welded by heating. Also, boxes can be made from knitted fabric, by cutting, semi-regular or regular method.

Cutting Method

When using the cutting method, the knitted fabric is cut into separate parts in accordance with the patterns of the future product, and then the parts are joined using a sewing machine.

Semi-Regular Method

In this case, the knitted fabric is made in the form of attachments on a special knitting machine. The width of each coupon is equal to the width of the future product.

Regular Method

A distinctive feature of this method is that the product is knitted entirely on an automatic machine and without seams. Sometimes individual parts are knitted, which are then sewn together with a single stitch.

There are embodiments available for boxes of a trapezoidal shape with a thickened base 23 (FIG. 23) and boxes with curves directed upward (see FIG. 24), also with a thickened base 23. Boxes of such shapes are installed with the base directed down, without a gap in relation to other boxes.

The boxes are installed according to the markings applied with paint, woven from threads, made from sewn with threads or glued ribbons or braids 7 (FIG. 2). Braid 7 divides the inner surface of the lower part of the cover or base 20 (FIG. 15D) into sections and marks the boundaries of the installation of the boxes.

The dimensions of a piece of foam rubber 8, taking into account tolerances, correspond to the length, width and height of box 4, and the dimensions of rectangular (in the shape of rectangular parallelepipeds) boxes are multiples of the width and length of the mattress. For example: if the mattress measures 2.2 meters long by 1.8 meters wide (height is not taken into account), then the dimensions of the boxes will be approximately 36 centimeters by 37 centimeters, excluding the spaces between them. That is, 30 boxes should be installed on such a mattress.

If the boxes or mattress are formed having different sizes, the number of boxes will be different. In addition, boxes of different sizes can be installed in the mattress. For example: larger boxes can be installed in the middle of the mattress, and smaller ones along the edges (not shown in the figures). In addition to rectangular, the boxes can have other shapes, for example: triangular, as well as rhombic, pentagonal, hexagonal (examples of box shapes are shown in FIGS. 18A, 18B, 18C and 18D).

FIG. 19 illustrates an embodiment of a mattress made up of triangular boxes. The mattress can consist of boxes of different shapes, for example: in the middle part of the mattress, quadrangular or pentagonal boxes can be installed, and on the edges, boxes with a different number of angles, for example: triangular. For example: FIGS. 20, 21, 22 show examples of mattresses made up of quadrangular and triangular boxes.

In addition, there are possible embodiments for mattresses consisting of puzzle-shaped boxes (not shown in the figures), as well as combinations of boxes of different geometric shapes, for example: circle, oval, semicircle.

Moreover, in mattresses with a combined composition of boxes, they can be presented in different sizes, for example: there may be more than one embodiment for triangular or other boxes, for example: rectangular and triangular boxes of different sizes can be installed in one mattress. The foam rubber inside boxes of any shape always has the appropriate size and shape.

In addition, foam rubber in boxes can have vertical (not shown in the figures) or horizontal perforation (FIGS. 14A, 14B). Moreover, these holes can be filled with more dense or less dense foam rubber or pneumatic inserts (not shown in the figures). In FIG. 14B, the holes are shown with thin lines, since it is assumed that the foam rubber is in the boxes. A pneumatic insert is a sealed container filled with gas made of polyethylene, rubber and other material capable of holding gas.

Carbon dioxide can serve as a gaseous filler.

Further, FIGS. 12A-12C show embodiments for foam rubber with a vaulted top, where embodiment 12A is a box with a double arch and horizontal perforation of the foam. FIG. 12B illustrates a box embodiment with a single arch and horizontal perforation of the foam, where there is a 17 hole. FIG. 12C illustrates a section of a box containing foam rubber with a two-vaulted top, where 4 is a box, 8 is foam rubber.

FIG. 13 shows a partial cross-section of the segmented mattress showing a view of the single arch boxes without perforations. Moreover, foam rubber embodiments with a large number of arches are possible. The boxes can be attached to the inner surface of the bottom of the case (or base 20, FIG. 15D) using snap buttons (not shown).

The boxes, together with the pieces of foam rubber installed on them, can be glued with glue or sewn with thread to the case, without the possibility of their separation (not shown in the figures). Such boxes are installed on a fabric base 20 (FIG. 15D), attached to the inner sides of the lower part of the cover 2 (FIG. 1A) using a zipper or Velcro, and in case of wear, parts of the boxes will be replaced with new ones, all at once, together with the base 20 (not shown in the figures).

Boxes fixed on the inner surface of the lower part of the cover (see FIG. 2) or on the base 20 (FIG. 15D) using Velcro can have a zipper 3 (see FIGS. 3A and 3B) along their perimeter to ensure the possibility of opening them to replace or wash what is in them foam rubber. FIG. 4 shows a design embodiment for box 4, similar to the design of a cardboard box with flaps.

This version of the box is shown in two projections, rotated 180 degrees relative to each other. This box is folded as follows: foam rubber 8 is placed inside the box, then sash A is placed on top of the foam rubber, to which Velcro 6 is sewn on the outside, after which sashes B and D are lowered, in which there are windows 9. In this case, windows 9 coincide with Velcro 6 doors A and do not overlap them.

Next, sash C is lowered with Velcro 6 sewn to it from the bottom side. At the same time, the Velcro of sash A coincides with the Velcro of sash C through the windows 9 of sashes B and D. The box is connected to the bottom of the cover 2 (see FIGS. 1A and 2) using Velcro installed on the outer side of the sash C, shown in the figure on the left in the form of a diagonal cross.

There may be a variety of arrangements of Velcro on the undersides of the boxes for attaching them to the inner surface of the underside of the cover 2 of the segmented mattresses, for example: in the form of crosses, stripes, corners, and the like.

FIG. 6 shows an embodiment of a box (bottom view) having a detachable lid made of fabric with Velcro 6 sewn thereon on both sides. Velcro for attaching the lid to the main body part of the box 4 is shown with dotted lines.

FIG. 7 shows an embodiment of the box, wherein the lid is made attached (sewn, glued) to one side thereof, wherein 6 is Velcro.

FIG. 16 shows an embodiment of the box, wherein 3—a zipper is fitted around the perimeter of its underside, 6—Velcro for fitting to the inside surface of the underside of the pouch (FIG. 1).

FIG. 17 shows an embodiment of the box, wherein 6 are Velcro, 3 are zippers installed along the diagonals of the box, the fastening portions of the bottom side of the box being bounded by the opening 21.

In addition to the described embodiments of boxes containing foam, there is also a possible embodiment of foam (not shown in the figures) to which a fabric is glued or welded on all sides, as well as on the top and bottom, to the underside of which Velcro or clothing buttons are glued or sewn for attaching to the base. This means that the fabric bonded to the foam acts as a box to which Velcro is attached.

The boxes can be mounted on the lower part of the cover 2 close to each other or, for example, with a gap of 0.5-3 centimeters or more (not shown). Inside the boxes 4, rectangular parallelepipedal foam 8 elements are placed in the form of rectangular parallelepipeds.

Thus (FIG. 1), with the cover unfastened, the inner part of the mattress is a horizontal surface consisting of boxes 4 installed side-by-side and attached to the base or to the inner surface of the lower part of the cover 2 with rectangular parallelepipeds made of foam rubber placed inside them. The advantage of this mattress design is that the layer of foam material is not continuous but is divided into many separate parts.

Thus, according to the invention the user lying on the mattress is not positioned on one or several continuous layers of foam material which are subject to deformation due to uneven load and, as a result, subject to uneven wear. To the contrary, in the invention the user lies on several or even several dozen separate small-sized mattress elements consisting of foam rubber 8, packed in boxes 4.

In addition, the fact that the boxes are fixed to the lower part of the cover 2 prevents them from moving under the action of loads in the horizontal plane relative to the other boxes. It is essential that since they are not connected to each other allows each box to perform its function independently of the other boxes.

Such design of the mattress, wherein its upper part is connected to the lower part by zipper 3 or Velcro and the boxes have locks—zippers or Velcro to connect their parts and fastened with Velcro, sewn with threads to the lower part of the cover, fastened with buttons, clothing buttons or Velcro. All of the above allow the user to disassemble the mattress of the invention into several parts for washing, replacing worn out boxes or worn-out foam contained therein.

Further, this design allows the user to move the boxes from one place to another on the inner surface of the lower part of the cover. This is in case of their wear and tear or contamination of individual parts of the mattress, since due to the unevenness of the load, the wear of the boxes during the use of the mattress will be uneven.

In the invention the user of the mattress can easily unbutton the upper part of the cover and change the worn-out boxes for those boxes which were less worn out during the mattress use. For example, this may occur when boxes from the middle of the mattress move to its edges, and boxes from the edges, move to the middle or change the worn-out boxes for new ones, together with the foam.

A segmented mattress can be a topper, a so-called sofa mattress consisting of a cover with a zipper around the perimeter and with boxes fastened inside it. Such a mattress can be the top, sewn, zippered or simply stacked on top, unattached part of any other spring or springless mattress.

Further, the mattress of the inventio can be equipped with massaging elements 12 and a programmable control unit 13 (FIG. 9) for relaxation, or for the care of bedridden patients. The massaging element (FIG. 10) is a device consisting of a housing 14 made, for example, of rubber, in the interior of which, on the lower part thereof is fixed an electric coil 15, which is an electromagnet, in which is placed a rod connected to the upper, elastic part of the housing of the massaging element with a permanent magnet 16 installed therein. The electromagnets of the massaging elements are connected in a certain order to the programmable control unit 13 (FIG. 9), which supplies electric current to the electromagnets.

When an electric current is applied to the electromagnets 15 of the massaging elements, a magnetic field is generated which pushes away from them the guide cores with permanent magnets 16, mounted to them with the same pole. In this case, the guide cores with permanent magnets 16 are pushed away from the electromagnets 15 lifting the upper parts of the bodies of the massaging elements 14 (FIG. 10B).

Further, the programmable control unit 13, in accordance with the program selected by the user, switches on and off the supply of electric current to separate groups of electromagnets 15 installed in the massaging elements. In this case, when part of the electromagnets is switched off, then under the influence of the user's body weight directed downwards, the massaging elements will be pressed down, decreasing in height, and when the current is supplied again, they will sharply or gradually increase in height.

Thus, the massaging effect will be achieved by applying and disconnecting electric current to the massaging elements, which, according to the selected program, will increase in height when the electric current is applied or decrease in height under the influence of the user's body weight.

There is also a possible variant of operation for massaging elements when an electric current of variable polarity is supplied from the programmable control unit to electromagnets. That is, an electric field is generated on the electromagnet, which, when polarity coincides, pushes the permanent magnets fixed with a certain pole downwards, and when polarity does not coincide, attracts them, thus creating oscillations of the upper parts of the massaging elements.

In addition, the massaging elements of the segmented mattress installed in the boxes may have a different design (FIG. 11B), wherein the permanent magnets 16 are installed without guide cores as in the previous embodiment and without the possibility of entering the inner space of the electromagnet 15.

Furthermore, the upper parts of the massaging elements may be made with a container (not indicated) made of a material providing a tight seal, for example: rubber, filled with a liquid or gel 24 (FIG. 11B). Moreover, the central regions of the shells 26 of the containers are not connected to the tops of the massaging elements 25 to provide a better massaging effect.

Still further, this design of the massaging element, wherein the apex of the massaging element 25 at the center is not connected to the vessel shell 26, allows not only vertical movements of the apex of the massaging element, but also horizontal movements of the apex of the massaging element.

This means that during operation of the massaging element vertically oriented movements of the apex are produced, whereby the shell 26 filled with liquid or gel 24, connected in the center with the apex of the massaging element 25, produces horizontal movements, similar to waves on water, when a stone plunging into water first creates a depression in the form of a funnel, but after a fraction of a second, when the funnel closes, a wave directed towards the center, i.e., the center of the massaging element is created.

The massaging effect is achieved not only by moving the top of the massaging element up and down, but also by wave-like movements of the liquid or gel 24 from the center to the sides and from the sides to the center. Thus, massaging movements directed not only vertically, but also horizontally are created.

Additionally, all or part of the mattress boxes may contain water or memory gel capsules in the shape of the boxes instead of foam (not shown). The boxes may also be equipped with electric or liquid heating elements to heat or cool the bed.

This mattress design requires additional equipment to supply heat or electricity to the boxes equipped with heating elements (not illustrated).

A mattress embodiment illustrated in FIGS. 15A-15D is also possible, wherein several layers of boxes containing foam are mounted on the multilayer mattress 10. An example with two layers of boxes is considered, wherein the boxes of the lower layer 19 are attached by means of Velcro 6 to the base 20, which is attached to the multilayer mattress by a zipper 3 around the perimeter.

Above the lower layer of boxes there is base 20 to which the upper layer of boxes 18 is fastened with Velcro 6. Moreover, the boxes of different layers may be of different sizes and shapes, i.e., the boxes of the upper layer 18 may be smaller, equal or larger in size than the boxes of the lower layer 19. On the other hand, the boxes of the upper layer 18 may be triangular, the boxes of the lower layer 19 may be rectangular in shape.

Moreover, the user can stack several mattresses one on top of the other to create a higher structure (see FIGS. 8A and 8B) consisting of several mattresses, to prevent the mattresses from moving under the load, Velcro and special overlays 22 can be sewn to their covers (outer shells).

The pads are sewn on the sides and ends of the mattress, rolled under the mattress and held there with Velcro. To create a multilayer construction, the user can place one mattress on top of another mattress and detach the pads from the underside of the mattress and attach them to the Velcro sewn over the pads of the lower mattress. In this way it is possible to create multi-layer constructions consisting of several mattresses that are securely fastened together.

According to another embodiment, Velcro 6 or buttons 11 (see FIG. 8A) are sewn on the sides of the mattresses to secure the sheets. In the case of buttons, the sheets must be provided with slots for buttons. However, if Velcro is used, Velcro must also be sewn on the edges of the sheets. In addition to buttons, clothes hooks can be sewn on the sheets and clothes ears on the mattress (not shown in the figures).

Alternatively, the upper portion of the cover 1 may be attached to the lower portion of the cover 2 (see FIG. 1A) or to another mattress using Velcro or buttons and loops (not illustrated).

The invention claimed is:

1. A segmented mattress or mattress topper comprising:

a cover including an upper cover portion and a lower cover portion, the upper cover portion and the lower cover portion being joined by a first reclosable fastener;

a fabric base layer disposed within the cover, the fabric base layer being removably fastened to the lower cover portion by a second reclosable fastener extending around a perimeter of the fabric base layer;

a segmented comfort layer enclosed within the cover and supported on the fabric base layer, the segmented comfort layer comprising a plurality of fabric boxes installed side-by-side in a single layer to form a horizontal support surface within the cover;

wherein each fabric box contains a separate foam insert, each foam insert having a shape corresponding to, and being receivable within, the respective fabric box;

wherein the plurality of fabric boxes containing the separate foam inserts divide foam material of the segmented comfort layer into a plurality of separate mattress elements such that the segmented comfort layer is not a continuous layer of foam material;

wherein the fabric boxes are removably attached to the fabric base layer by reclosable fasteners;

a plurality of massaging elements contained in at least some of the fabric boxes; and a programmable control unit electrically connected to the plurality of massaging elements;

wherein each massaging element comprises:

a housing having a lower portion and an upper elastic portion;

an electromagnet fixed in the lower portion of the housing; and a guide core with a permanent magnet, the guide core being movably received at least partially within the electromagnet and being connected to the upper elastic portion of the housing;

wherein the programmable control unit is configured to supply electric current to the electromagnet of each massaging element to generate a magnetic field that moves the guide core with the permanent magnet relative to the electromagnet, thereby lifting the upper elastic portion of the housing to provide a massage effect.

2. The segmented mattress or mattress topper of claim 1, wherein each electromagnet comprises an electric coil fixed in the lower portion of the housing of the respective massaging element.

3. The segmented mattress or mattress topper of claim 1, wherein each permanent magnet is oriented such that the magnetic field generated by the corresponding electromagnet repels the permanent magnet and lifts the upper elastic portion of the corresponding housing.

4. The segmented mattress or mattress topper of claim 1, wherein the programmable control unit is configured, according to a program selected by a user, to switch on and switch off the supply of electric current to separate groups of electromagnets installed in the massaging elements.

5. The segmented mattress or mattress topper of claim 4, wherein the massaging elements are configured to decrease in height under a user's body weight when electric current to corresponding electromagnets is switched off, and to increase in height when electric current is supplied again to the corresponding electromagnets.

6. The segmented mattress or mattress topper of claim 1, wherein the programmable control unit is configured to supply electric current of variable polarity to the electromagnets to create oscillations of the upper elastic portions of the massaging elements.

7. The segmented mattress or mattress topper of claim 1, wherein the fasteners are hook-and-loop fasteners.

8. The segmented mattress or mattress topper of claim 1, wherein the first and second reclosable fasteners are first and second zippers.

* * * * *